US012711557B2

(12) United States Patent
Gleyzes

(10) Patent No.: US 12,711,557 B2
(45) Date of Patent: Aug. 18, 2026

(54) SYSTEMS AND METHODS FOR TRAINING MODELS

(71) Applicant: Xero Limited, Te Aro (NZ)

(72) Inventor: Jerome Gleyzes, Te Aro (NZ)

(73) Assignee: Xero Limited, Wellington (NZ)

( * ) Notice: Subject to any disclaimer, the term of this patent is extended or adjusted under 35 U.S.C. 154(b) by 12 days.

(21) Appl. No.: 18/028,395

(22) PCT Filed: Aug. 19, 2021

(86) PCT No.: PCT/NZ2021/050134
§ 371 (c)(1),
(2) Date: Mar. 24, 2023

(87) PCT Pub. No.: WO2022/177448
PCT Pub. Date: Aug. 25, 2022

(65) Prior Publication Data

US 2023/0385951 A1 Nov. 30, 2023

(30) Foreign Application Priority Data

Feb. 18, 2021 (AU) ................................ 2021900420

(51) Int. Cl.
*G06Q 40/12* (2023.01)

(52) U.S. Cl.
CPC .................................... *G06Q 40/12* (2013.12)

(58) Field of Classification Search
None
See application file for complete search history.

(56) References Cited

U.S. PATENT DOCUMENTS

| | | | | |
|---|---|---|---|---|
| 11,042,700 | B1 * | 6/2021 | Walters | G06F 40/169 |
| 2019/0303447 | A1 * | 10/2019 | Mohiuddin Khan | G06V 30/412 |
| 2020/0012933 | A1 | 1/2020 | Truong et al. | |
| 2020/0334456 | A1 | 10/2020 | Sridharan | |
| 2020/0364451 | A1 * | 11/2020 | Ammar | G06F 40/103 |
| 2021/0158036 | A1 * | 5/2021 | Huber, Jr. | G06V 30/413 |

* cited by examiner

*Primary Examiner* — Ariel J Yu
(74) *Attorney, Agent, or Firm* — Young Basile Hanlon & MacFarlane. P.C

(57) ABSTRACT

A method comprises determining a batch of training data for training a model comprising a plurality of datasets, each associated with a label and comprising at least one numerical representation of an example document; determining a number of classes of labels in the batch, each class associated with a unique attribute value; and determining a number of numerical representations associated with each class. The method comprises: determining a first similarity measure indicative of the similarity of the numerical representation to the other numerical representations associated with a same class; determining a second similarity measure for each of the other datasets associated with a different respective class, each second similarity measure indicative of the similarity of the numerical representation to each of the at least one numerical representations of the respective other datasets associated with respective different classes of the batch; determining a difference measure and a normalized difference measure.

14 Claims, 2 Drawing Sheets

SYSTEMS AND METHODS FOR TRAINING MODELS

CROSS-REFERENCE TO RELATED APPLICATION(S)

This application is a 371 national phase application of International Application Serial No. PCT/NZ2021/050134, filed Aug. 19, 2021, which claims priority to and the benefit of Australian Patent Application Serial No. 2021900420, filed Feb. 18, 2021, the entire disclosures of which are hereby incorporated by reference.

TECHNICAL FIELD

Embodiments generally relate to systems, methods and computer-readable media for training models, such as machine learning models. Some embodiments relate in particular to systems, methods and computer-readable media for training attribute prediction models to determine or identify attributes, such as entity identifiers, associated with documents such as accounting or bookkeeping records.

BACKGROUND

When an account holder or accountant receives an accounting record, such as an invoice or a receipt, from an entity, the accountant has to determine the entity to which the accounting record relates in order to input the relevant information into an accounting or bookkeeping system. However, accounting records can differ drastically from one entity to another and automated systems often struggle to correctly identify an entity associated with a particular accounting record.

Machine learning models can be trained to generate or predict attributes associated with such accounting records and to automatically reconcile transactions, or provide meaningful reconciliation suggestions to a user to allow the user to manually reconcile the transactions. However, the training of such models to make accurate predictions or suggestions can be difficult, particularly if the model is being trained on a training dataset of transactions reconciled by a plurality of different users.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Described embodiments relate to a method comprising: determining a batch of training data for training a model, the training data comprising a plurality of datasets, each dataset associated with a label and comprising at least one numerical representation of an example document; determining a number of classes of labels in the batch, wherein each class is associated with a unique attribute value; determining a number of numerical representations associated with each class in the batch; for each numerical representation in each dataset: determining a first similarity measure indicative of the similarity of the numerical representation to the other numerical representations in associated with a same class; determining a second similarity measure for each of the other datasets associated with a different respective class in the batch, each second similarity measure indicative of the similarity of the numerical representation to each of the at least one numerical representations of the respective other datasets associated with respective different classes of the batch; determining a difference measure as a function of the first similarity measure and the one or more second similarity measures; and determining a normalised difference measure by dividing the difference measure by the number of example documents associated with the same class of the dataset; and determining a loss value as a function of the normalised difference measures of the example documents in the batch.

In some embodiments, determining the loss value may comprise summing the normalised difference measures of the numerical representations in the batch and dividing by the number of classes. In some embodiments, determining the loss value may comprise summing the normalised difference measures of the numerical representations in the batch and dividing by the number of classes that have a dataset with at least one numerical representation.

In some embodiments, determining the second similarity measure for each of the other datasets associated with a different respective class in the batch comprises: determining a second similarity measure for each of the other datasets; and disregarding or ignoring a second similarity measure for each other dataset associated with or having a class corresponding to the class of the dataset (i.e. the same class). In some embodiments, determining the second similarity measure for each of the other datasets in the batch may comprise determining a second similarity measure as zero for each other dataset having a class corresponding to the class of the dataset. The difference measure may be indicative of the similarity of the example document to the other example documents in or associated with the same class relative to the example documents of the other datasets associated with respective different classes of the batch.

Determining the first similarity measure may comprise determining the average dot product of the numerical representation to each of the other numerical representations in or associated with the same class, and wherein determining the second similarity measure may comprise determining the average dot product of the numerical representation to each of the other numerical representations in the other respective datasets associated with the respective different classes.

The labels may be entity labels and each class of label or each unique label may identify a particular entity. The example documents may be derived from previously reconciled accounting documents of an accounting system, each of which has been associated with a respective entity, and wherein the label of each document is indicative of the respective entity.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Various ones of the appended drawings merely illustrate example embodiments of the present disclosure and cannot be considered as limiting its scope.

DESCRIPTION OF EMBODIMENTS

Figure 1:
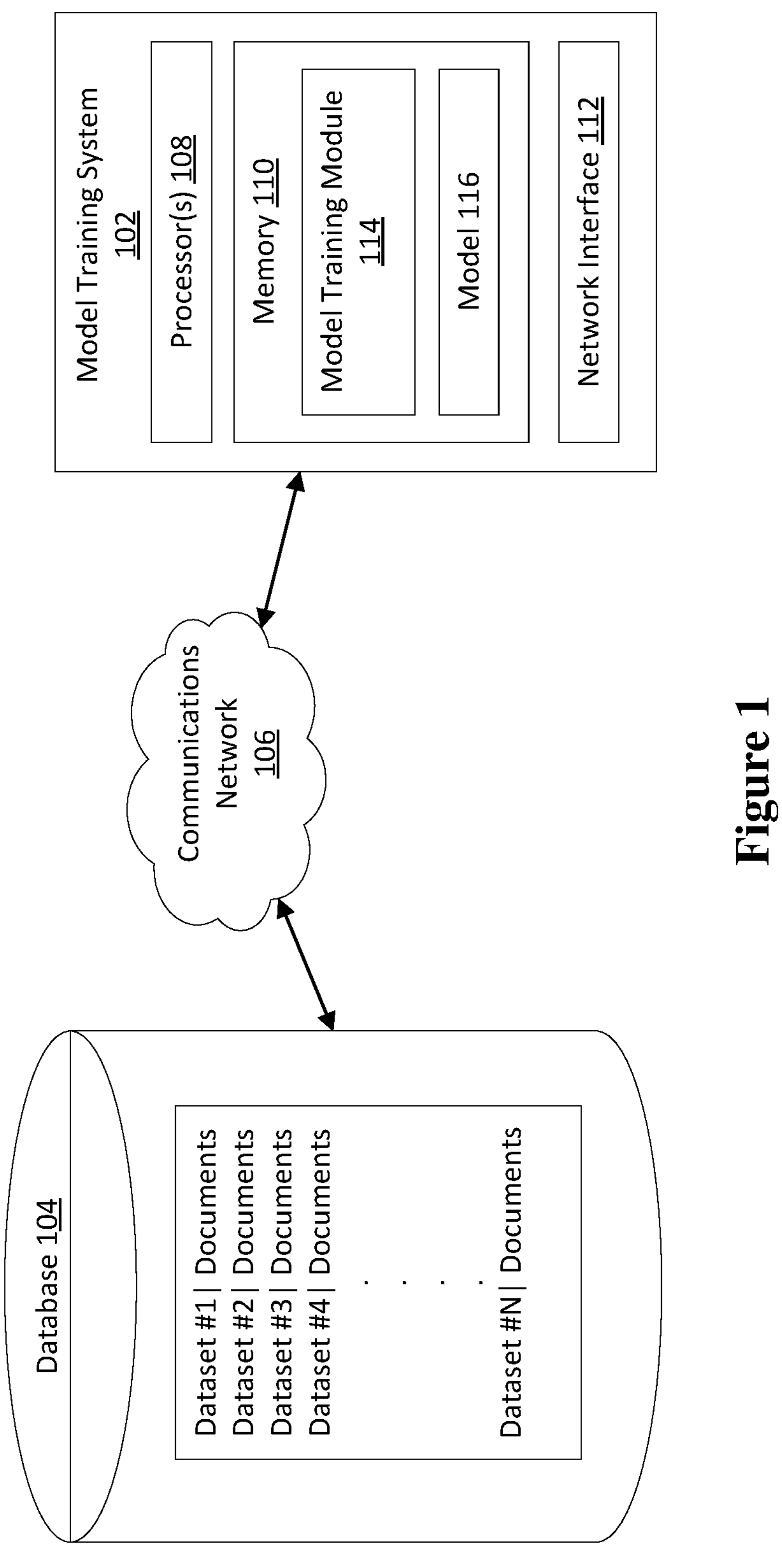
FIG. 1 is a schematic diagram of a communication system comprising an system for training a machine learning model, according to some embodiments.

Embodiments generally relate to systems, methods (e.g., computer-implemented methods) and computer-readable media (e.g., a computer-readable storage medium storing instructions that, when executed by a computing system, cause the computing system to perform operations) for training models, such as machine learning models. Some embodiments relate in particular to systems, methods and computer-readable media for training prediction models to determine or identify attributes, such as entity identifiers, associated with documents, such as accounting or bookkeeping records.

The effectiveness and accuracy of such machine learning models depends largely on the quality of a batch of training data or datasets used to train the model. A batch of training data may be a set or a subset of data in a training data database or a subset of training datasets of a greater set of training datasets. However, it is not always possible to ensure that the examples in training datasets won't negatively impact or bias or skew the model being trained. This is particularly problematic where the database from which training examples are being extracted comprises duplicate datasets of examples for a given attribute, or missing or corrupt example documents. For example, some attributes may be over represented in a database due to the statistical distribution of a customer base and/or customer activities associated with the documents in the database. This is often the case where the database of documents are generated by or otherwise associated with customers of an online accounting platform.

As can be the case with databases accessible to accounting systems that maintain accounts for a large number of entities, the database may include duplicate datasets for a given entity, with each dataset comprising example documents (and/or numerical representations thereof), such as financial or accounting records, associated with an entity. For example, duplicate datasets may be a plurality of datasets that each have the same attribute or class (e.g., are associated with the same entity), but which may comprise the same or different example documents (and/or numerical representations thereof). In such circumstances, a batch of training datasets extracted from the database may include duplicate datasets from the same entity, which may lead to a less effective training of the model. For example, when the model is an attribute prediction model, it may be being trained to recognise that documents within a given dataset have a common attribute, i.e. are similar, and that documents in other datasets have a different respective attribute, i.e. are dissimilar. If duplicate datasets are included in the training batch, the model will be trained to recognise that examples from a first dataset are similar and that examples from a duplicate dataset are dissimilar, despite the fact that the examples from both the first and duplicate dataset are likely to be similar, having a common attribute, such as originating with or being issued by a common entity. Additionally, the model will be trained on more than one dataset for a given attribute, which may introduce bias to the model. Similarly, where example documents cannot be retrieved for one or more datasets, the model may be trained using unequal numbers of example documents for each different attribute.

Where the database from which the training data is being extracted comprises a large number of datasets, which is generally desirable for training purposes, the task of ensuring that the batch of datasets selected for training purposes does not include duplicates or missing or corrupt example documents may be onerous and computationally inefficient.

The described embodiments provide improved systems, methods and computer-readable media for training models that account for the possibility of duplicate datasets or missing or corrupt example documents in the training batch without needing to pre-screen or filter the training batch. In particular, the described embodiments determine a number of classes of label, or attribute values of an attribute type, within a batch of datasets, and a number of numerical representations of example documents associated with each class. When a difference measure indicative of the similarity of each example document to the other documents in or associated with a particular class relative to the example documents in the other datasets associated with other classes of the batch is determined, it is normalised (e.g., normalized) by dividing it by the number of numerical representations associated with the class of the dataset. In this way, if the batch includes duplicate datasets for a particular attribute, such as duplicate datasets for a particular entity, the impact of the examples of the duplicate datasets on the training of the model is mitigated or negated. Furthermore, in determining the difference measure, when assessing the similarity of an example document to example documents in other datasets, where the other dataset has the same class of label as the example document under consideration, a zero value is allocated. This further mitigates or negates the impact of duplicate datasets in the batch.

While the terms "similarity measure" and "difference measure" are used herein, it will be appreciated that the terms may be used to generally refer to measures which are indicative of a "similarity" and a "difference", respectively. Accordingly, a distance measure could be considered indicative of a similarity or difference, for example.

A loss value is then determined as a function of the normalised difference measures of all of the numerical representations in the batch. In some embodiments, determining the loss value comprises summing the normalised difference measures of the numerical representations in the batch and dividing by the number of labels that have a dataset with at least one numerical representation. In this way, where example documents (or numerical representations) are missing or unable to be retrieved from datasets, any uneven or unequal numbers of example documents of datasets relative to other datasets is accounted for, and factored into the loss value.

Accordingly, the described embodiments provide for systems, methods and computer-readable media capable of training models using imbalanced training batches, for example, that may include an unknown number of example documents that are not retrievable, and may include duplicate datasets, while mitigating or negating any adverse effect on the integrity of the trained model.

Furthermore, by taking a batch-wise approach including normalisation, any skewing impact an unknown number of irretrievable example documents, an unequal numbers of example documents in different datasets of the batch, and/or duplicate labels or datasets may otherwise have on the model being trained may be negated or mitigated. Additionally, by taking the batch-wise approach including normalisation, the severity of the skew that might otherwise arise need not be known in order to mitigate it. Accordingly, new data may be added to the database from which the batches are extracted or retrieved without requiring any skew value to be recalculated.

In some embodiments, the formula used to determine the loss value (i.e. the cost function, or n-tuple loss function) is as follows:

$$L = \frac{1}{N_{valid}} \sum_{i|label(i)\neq -1} \frac{1}{N_{cls(i)}} \log\left(1 + \sum_{label} \exp\left(avg_{per\ label}\left(f_i^T f_j\right) - avg\left(f_i^T f_{i+}\right)\right)\right)$$

where {i, i+} denotes a pair of example documents with the same class value (e.g. associated with the same entity), {i, j} denotes a pair of documents with different label values, f is a function that maps an example document i to a vector representation of that document, $N_{valid}$ is the number of classes in the batch with at least one retrievable example document belonging to it, and $N_{cls(i)}$ the number of examples in the batch with the same class as example i. In instances where an example document cannot be retrieved, label(i)=−1. The cost function encourages the similarity of documents of the same class to be greater than that of documents from different classes.

Referring now to FIG. 1, there is shown a schematic of a system 100 comprising a model training system 102 in communications with a database 104 across a communications network 106. In some embodiments, the model training system 102 may form part of an accounting system configured to maintain accounts for a plurality of entities and store financial and accounting related information in the database 104. In some embodiments, the system is distinct from an accounting system (not shown) but nonetheless may be configured to communicate with and provide services to the accounting system (not shown) across the communications network 106. Examples of a suitable communications network 106 include a cloud server network, wired or wireless internet connection, Bluetooth™ or other near field radio communication, and/or physical media such as USB.

The model training system 102 comprises one or more processors 108 and memory 110 storing instructions (e.g. program code) which when executed by the processor(s) 108 causes the model training system 102 to function according to the described methods. The processor(s) 108 may comprise one or more microprocessors, central processing units (CPUs), graphical/graphics processing units (GPUs), application specific instruction set processors (ASIPs), application specific integrated circuits (ASICs) or other processors capable of reading and executing instruction code.

Memory 110 may comprise one or more volatile or non-volatile memory types. For example, memory 110 may comprise one or more of random access memory (RAM), read-only memory (ROM), electrically erasable programmable read-only memory (EEPROM) or flash memory. Memory 110 is configured to store program code accessible by the processor(s) 108. The program code comprises executable program code modules. In other words, memory 110 is configured to store executable code modules configured to be executable by the processor(s) 108. The executable code modules, when executed by the processor(s) 108 cause the model training system 102 to perform certain functionality, as described in more detail below.

The model training system 102 further comprises a network interface 112 to facilitate communications with components of the system 100 across the communications network 106, such as the database 104 and/or other systems or servers (not shown). The network interface 112 may comprise a combination of network interface hardware and network interface software suitable for establishing, maintaining and facilitating communication over a relevant communication channel.

The database 104 may form part of or be local to the model training system 102, or may be remote from and accessible to the model training system 102. The database 104 may be configured to store data, documents and records associated with entities having user accounts with the model training system 102, availing of the services and functionality of the model training system 102, or otherwise associated with the model training system 102. For example, where the model training system 102 is an accounting system or is configured to service an accounting system, the data, documents and/or records may comprise business records, banking records, accounting documents and/or accounting records.

The model training system 102 may also be arranged to communicate with third party servers or systems (not shown), to receive records or documents associated with data being monitored by the model training system 102. For example, the third party servers or systems (not shown), may be financial institute server(s) or other third party financial systems and the model training system 102 may be configured to receive financial records and/or financial documents associated with transactions monitored by the model training system 102. For example, where the model training system 102 is associated with or part of an accounting system 102, it may be arranged to receive bank feeds associated with transactions to be reconciled by the accounting system 102, and/or invoices or credit notes or receipts associated with transactions to be reconciled from third party entities.

Memory 110 comprises a model training module 114, which when executed by the processors(s) 108, causes the model training system 102 to train a model 116, such as a machine learning model. In some embodiments, the model training module 114 is configured to retrieve a batch of training datasets (or subset of training datasets of a greater set of training datasets) from the database 106, or elsewhere, and provide relevant features to the machine learning model 116 to be trained (the untrained model). Each training dataset comprises one or more example documents, or one or more numerical representations of example documents, and a label or attribute value associated with the dataset. For example, the label may be an entity identifier. The batch of datasets may include multiple datasets associated with a same class of entity identifier. For example, the batch may include multiple datasets for the class of entity Xero, Ltd. More particularly, in some embodiments, the model training module 114 may provide inputs including one or more numerical representations, labels associated with the numerical representations, such as entity identifiers, a number of labels in the batch, and a number of examples in the batch. The output of the model 116 to be trained is a scalar representing the loss.

In some embodiments, for a batch of training examples, the inputs may include "numerical representations", "labels", "n_labels", and "n_examples. The feature of "numerical representations" (which may include embeddings) is a batch or matrix of multiple numerical representations having a size [batch_size, embed_dim], the feature of "labels" has size [batch_size], the feature "n_labels" is the number of labels in the batch and "n_examples" is the number of examples per label or dataset. For example, the number of datasets per batch may be a predefined number, such as 30 datasets. Additionally or alternatively, the number of example documents per dataset may be a predefined number, such as four. Accordingly, in some embodiments, model training module 114 retrieves a collection of 30 datasets with four example documents (and/or numerical representations thereof) each, per training batch. However, some or all of the example documents may not be retrievable, for example, because one or more files, documents or numerical representations is corrupted, deleted by a user, or otherwise irretrievable, etc.). In any event, the batch_size is simply n_labels*n_examples. By utilising a batch-wise approach including normalisation, the model training module 114 may negate or mitigate any skewing impact an unknown number of irretrievable example documents, an unequal numbers of example documents in different datasets of the batch, and/or duplicate labels or datasets may otherwise have on the model 116 being trained. Additionally, by taking the batch-wise approach including normalisation, the severity of the skew that might otherwise arise need not be known in order to mitigate it. Accordingly, new data may be added to the database from which the batches are extracted or retrieved without requiring any skew value to be recalculated.

In some embodiments, the batch size, number of datasets per batch and/or the number of examples per dataset may be predefined in any suitable manner. For example, the batch size may be selected according to hardware constraints, such as processor(s) size, GPU size, or the like. Additionally or alternatively, the batch size may be selected according to a trade-off between model stochasticity and convergence, for instance, in order to balance model stability (and less likelihood of stochastic behaviour) and rate of convergence of the model.

Additionally or alternatively, selection of a predefined batch size (and/or predefined number of datasets per batch and/or examples per dataset) may be influenced by the composition or nature of the training data or datasets. For instance, as the method uses a batched approach to re-weighting skew that may be introduced by duplicate datasets and/or varying numbers of retrievable example documents per dataset, it will be appreciated that any re-weighting may be limited to "batch_size-1". Accordingly, a larger predefined batch size may be selected where the training data includes a very high number of duplicates of a particular dataset.

In some examples, the predefined batch size, number of datasets per batch, and/or number of examples in each dataset may be the same or different among batches and/or datasets. Advantageously, utilising the same predefined numbers across multiple batches and datasets may provide implementation simplicity (in other words, the implementation may be simpler to code).

Figure 2:
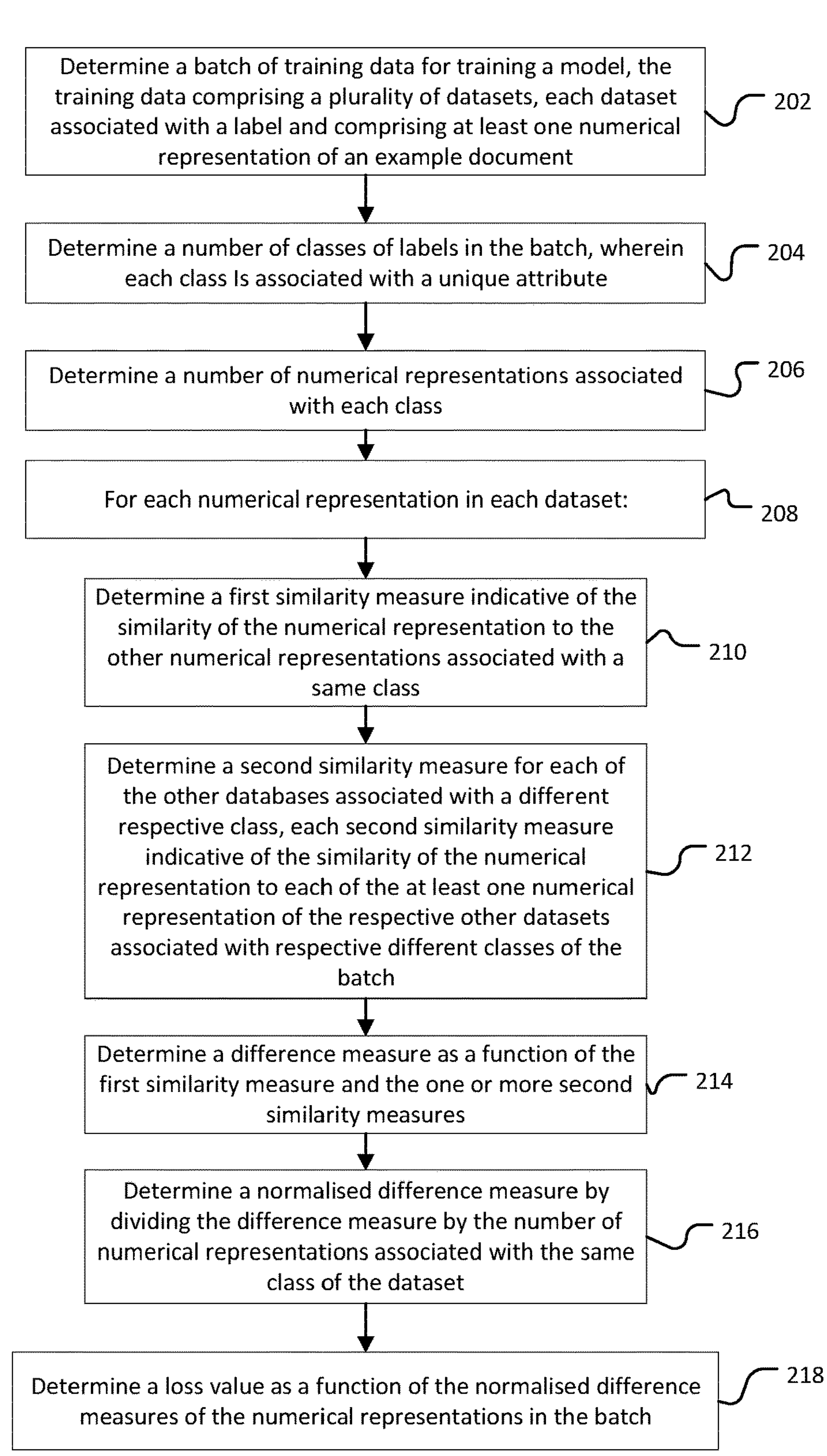
FIG. 2 is a process flow diagram of a method of training a machine learning model, according to some embodiments.

FIG. 2 is a process flow diagram of a method 200 for training machine learning models, such as prediction models, according to some embodiments. The method 200 may, for example, be implemented by the processor(s) 108 of model training system 102 executing instructions stored in memory 110.

At 202, the model training system 102 determines a batch of training data for training a model, the training data comprising a plurality of datasets, each dataset associated with a label and comprising at least one numerical representation of an example document. The example documents may be derived from previously reconciled accounting documents of an accounting system, each of which has been associated with a respective entity. The label may be indicative of an attribute associated with the dataset, and example documents, such as an entity identifier or entity label. There may, however, be multiple datasets with a common label or class, such as a particular entity. Where duplicate datasets are present in the batch, the number of classes will be less than the number of labels.

In some embodiments, the datasets are labelled with associated attributes according to embodiments described in the Applicant's co-pending Australia provisional patent application No. 2021900421, entitled "Systems and methods for generating labelled datasets", filed on 18 Feb. 2021, the entire content of which is incorporated herein by reference. As described in that application, a plurality of documents is provided to a numerical representation generation model to generate respective numerical representations of the respective documents. A document score for the document is determined based on the numerical representation. The document scores for the plurality of documents are clustered by a clustering module into one or more clusters, with each cluster being associated with a class of the example documents. A cluster identifier may be determined for each of the one or more clusters and the cluster identifiers may associated with respective documents to label the documents as having particular attributes.

Numerical representations of the example documents may be determined in any suitable manner, and may depend on the purpose for which the model is being trained. An example of a method of transforming or converting the example documents into numerical representations includes the Xception model (Deep Learning with Depthwise Separable Convolutions, Francois Chollet; Proceedings of the IEEE Conference on Computer Vision and Pattern Recognition (CVPR), 2017, pp. 1251-1258).

In some embodiments, the numerical representations are generated according to embodiments described in the Applicant's co-pending Australia provisional patent application No. 2021900419, entitled "Systems and methods for generating document numerical representations", filed on 18 Feb. 2021, the entire content of which is incorporated herein by reference.

At 204, the model training system 102 determines a number of classes of labels in the batch, wherein each class identifies or is associated with a unique attribute, such as an entity associated with the documents in the batch. For example, where the batch includes 30 datasets, but three of those are associated with the same entity, the number of labels (or datasets) in the batch will be 30, but the number of classes (unique label values) will be 28.

At 206, the model training system 102 determines a number of example documents (or numerical representations of example documents) associated with each class. For example, where three datasets, each comprising four example documents, are considered to be duplicates (i.e., are associated with a common attribute such as a common entity), the number of example documents associated with the class of the datasets will be 12.

As indicated at 208, steps 210 to 216 are performed for each numerical representation in each dataset.

At 210, the model training system 102 determines a first similarity measure indicative of the similarity of the numerical representation to the other numerical representations in the same class. In some embodiments, the model training system 102 determines the first similarity measure as the average dot product of the numerical representation to each of the other numerical representations in the class.

With reference to the example formula presented above, the first similarity measure may comprise $$avg(f_i^T f_{i+}),$$

which is the average dot product of the numerical representation to its positive pairs (i.e. all the other examples from the same class in the batch). If another example document i+ cannot be retrieved or determined, it would be assigned a value of zero, and be excluded from the first similarity measure. The resulting first similarity measure may be a scalar.

At 212, the model training system 102 determines a second similarity measure for each of the other datasets in the batch. Each second similarity measure may be indicative of the similarity of the numerical representation to each of the at least one numerical representation of the respective other datasets of the batch. In some embodiments, the model training system 102 determines the second similarity measure as zero or disregards the second similarity measure for each other dataset having a class corresponding to the class of the dataset. By assigning the second similarity measure for datasets having the same class as the numerical representation being considered as zero or otherwise disregarding such second similarity measures, the problem mentioned above of training the model to recognise example documents from a duplicate dataset as being dissimilar is avoided. In one example, when a resulting loss function is used in a machine learning model, setting such second similarity measures to zero may provide a convenient mathematical way to ensure that those second similarity measures do not propagate a gradient back through a network of the model. Alternatively, such second similarity measures may be disregarded from the loss function entirely.

In some embodiments, the model training system 102 determines the second similarity measure as the average dot product of the numerical representation to each of the other numerical representations in the other datasets. For example, the second similarity measure may comprise a vector of average dot products, each average dot product being indicative of the similarity of the numerical representation to the numerical representation(s) of another dataset of the batch.

With reference to the example formula presented above, the second similarity measure may comprise $$avg_{per\ label}(f_i^T f_j),$$

which is the average dot product for example document i and example documents of each other dataset of the other labels. The resulting second similarity measure may be a vector. For example, where there are 30 labels, the second similarity measure would be a vector of length 30.

At 214, the model training system 102 determines a difference measure as a function of the first similarity measure and the one or more second similarity measures. The difference measure may be indicative of the similarity of the select document to the other entity documents in the selected class relative to the documents from the other datasets of the batch. In embodiments, the model training system 102 ignores or disregards second similarity measure (s) for or associated with each other dataset having a class corresponding to the class of the dataset.

The model training system 102 may determine a vector of difference values, each value being associated with a respective dataset, and the model training system 102 may transform the vector of difference values into the difference measure. For example, the model training system 102 may use an additional model, for example a logistic regression, or feed forward network, to learn a function that transforms the vector of difference values into a scalar measure of difference for comparison.

With reference to the example formula presented above, the difference measure may be represented as:

$$avg_{per\ label}(f_i^T f_j) - avg(f_i^T f_{i+}).$$

In other words, the model training system 102 determines for an example document i, and for each dataset different from the dataset of example document i, the difference between the average dot product of example document i and example documents from the different datasets and the average dot product of example document i and example documents from the same class. To enable the subtraction to be performed, $$avg(f_i^T f_{i+})$$

may be broadcast or duplicated to correspond with the size or shape of $$avg_{per\ label}(f_i^T f_j).$$

At 216, the model training system 102 determines a normalised difference measure by dividing the difference measure by the number of example documents (or numerical representations) associated with the class of the dataset. Where there are duplicate datasets, there will likely be more example documents (and numerical representations) associated with one class than other classes or labels. In other words, there will be an unequal number of example documents being considered per class (for example, for each entity). By determining the normalised difference measure, if duplicate datasets are present in the batch, the fact that there may be more example documents corresponding to a specific class, for example, a particular entity, is accounted for, mitigating or negating the impact of the duplicates on the model being trained.

As mentioned above, steps 210 to 216 are performed for each numerical representation in each dataset. At 218, the model training system 102 determines a loss value as a function of the normalised difference measures of the numerical representations in the batch.

The model training system 102 may determine the loss value by summing the normalised difference measures of the numerical representations in the batch and dividing by the number of classes. In some embodiments, the model training system 102 determines the loss value by summing the normalised difference measures of the numerical representations in the batch and dividing by the number of classes that have a dataset with at least one example document.

In some embodiments, calculated error or loss value may be back-propagated through various layers of neurons in the model being trained. Back-propagation of the error may include calculation of error gradients at each stage and adjustment of the weights of each layer of neurons based on the calculated error gradients. The back-propagation may continue further through to the input layer of the model. In embodiments where multiple models are being trained together, such as the image-character based numerical representation generation model, text-based numerical representation generation model and the image-based numerical representation generation model of co-pending Australia provisional patent application No. 2021900419, entitled "Systems and methods for generating document numerical representations", filed on 18 Feb. 2021 (incorporated herein by reference), the back-propagation may continue through to the input layer of the image-character based numerical representation generation model, and then onto the output layers of the text-based numerical representation generation model and the image-based numerical representation generation model. The back-propagation process may continue through the various layers of neurons in the text-based numerical representation generation model and the image-based numerical representation generation model, wherein at each stage a gradient may be calculated and weight of the neurons may be adjusted through all the layers of neurons in the respective models.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method comprising:

storing, by a computer-readable memory, a training data database comprising a plurality of datasets of example documents generated by or associated with customers of an accounting system;

at a model training system of the accounting system, the model training system comprising a network interface, one or more processors, and a computer-readable memory storing a model training module, and models to be trained comprising an image-based numerical representation generation model and a text-based numerical representation generation model, the model training system further comprising one or more processors configured to execute instructions stored in the memory, extracting from the training data database and via a communications network and the network interface, a batch of training data for training models to be trained, the extracted training data comprising a plurality of datasets, each dataset associated with a label and comprising at least one numerical representation of an example document;

determining, by the model training system, a number of classes of labels in the batch, wherein each class is associated with a unique attribute value;

determining, by the model training system, a number of numerical representations associated with each class in the batch;

providing the numerical representations to the models to be trained;

for each numerical representation in each dataset:

determining, by the models to be trained, a first similarity measure indicative of a similarity of the numerical representation to other first numerical representations associated with a same class;

determining, by the models to be trained, a second similarity measure for each of other datasets associated with a different respective class in the batch, each second similarity measure indicative of the similarity of the numerical representation to each of the at least one numerical representations of respective other datasets associated with respective different classes of the batch;

determining, by the models to be trained, a difference measure as a function of the first similarity measure and one or more second similarity measures; and determining, by the models to be trained, a normalized difference measure by dividing the difference measure by the number of example documents associated with the same class of the datasets;

determining, by the model training system, a loss value as a function of normalized difference measures of the example documents in the batch, wherein determining the loss value comprises summing the normalized difference measures of the numerical representations in the batch and dividing by the number of classes that have a dataset with at least one numerical representation;

back-propagating the loss value through a plurality of layers of the models being trained including calculating, by the model training system, based on the determined loss value, at each layer of neurons in the text-based numerical representation generation model and the image-based numerical representation generation model a plurality of error gradients; and adjusting, by the model training system, based on the plurality of error gradients, weights of each layer of neurons in the text-based numerical representation generation model and the image-based numerical representation generation model to train the text-based numerical representation generation model and the image-based numerical representation generation model.

2. The method of claim 1, wherein determining the second similarity measure for each of the other datasets associated with a different respective class in the batch comprises:

determining, by the models to be trained, a second similarity measure for each of the other datasets; and disregarding or ignoring a second similarity measure for each other dataset associated with a class corresponding to the class of the datasets.

3. The method of claim 1, wherein the difference measure is indicative of the similarity of the example document to other example documents associated with the same class relative to the example documents of the other datasets associated with the respective different classes of the batch.

4. The method of claim 1, wherein determining the first similarity measure comprises determining, by the models to be trained, an average dot product of the numerical representation to each other numerical representations associated with the same class, and wherein determining the second similarity measure comprises determining, by the models to be trained, the average dot product of the numerical representation to each of the other numerical representations in other respective datasets associated with the respective different classes.

5. The method of claim 1, wherein the labels are entity labels and each class of label identifies a particular entity.

6. The method of claim 1, wherein the example documents are derived from previously reconciled accounting documents of the accounting system, each of which has been associated with a respective entity, and wherein the label of each document is indicative of the respective entity.

7. A computing system comprising:

a computer-readable memory configured to store a training data database comprising a plurality of datasets of example documents generated by or associated with customers of an accounting system; and the accounting system comprising a model training system, the model training system comprising:

a network interface;

one or more processors; and a computer-readable memory storing a model training module, and models to be trained comprising an image-based numerical representation generation model and a text-based numerical representation generation model, the computer-readable memory further storing computer executable instructions, which when executed by the one or more processors, cause the one or more processors to:

extract from the training data database and via a communications network and the network interface, a batch of training data for training the models to be trained, the extracted training data comprising a plurality of datasets, each dataset associated with a label and comprising at least one numerical representation of an example document;

determine a number of classes of labels in the batch, wherein each class is associated with a unique attribute value;

determine a number of numerical representations associated with each class in the batch;

provide the numerical representations to the models to be trained;

for each numerical representation in each dataset:

determine, by the models to be trained, a first similarity measure indicative of a similarity of the numerical representation to other first numerical representations associated with a same class;

determine, by the models to be trained, a second similarity measure for each of other datasets associated with a different respective class in the batch, each second similarity measure indicative of the similarity of the numerical representation to each of the at least one numerical representations of respective other datasets associated with respective different classes of the batch;

determine, by the models to be trained, a difference measure as a function of the first similarity measure and one or more second similarity measures; and determine, by the models to be trained, a normalized difference measure by dividing the difference measure by the number of example documents associated with the same class of the datasets;

determine, by the model training system, a loss value as a function of normalized difference measures of the example documents in the batch, wherein determining the loss value comprises summing the normalized difference measures of the numerical representations in the batch and dividing by the number of classes that have a dataset with at least one numerical representation; and back-propagate, by the model training system, the loss value through a plurality of layers of the models being trained including determining, based on the determined loss value, at each layer of neurons in the text-based numerical representation generation model and the image-based numerical representation generation model a plurality of error gradients; and adjust, by the model training system, based on the plurality of error gradients, weights of each layer of neurons in the text-based numerical representation generation model and the image-based numerical representation generation model to train the text-based numerical representation generation model and the image-based numerical representation generation model.

8. The computing system of claim 7, wherein determining the second similarity measure for each of the other datasets associated with a different respective class in the batch comprises:

determining, by the models to be trained, a second similarity measure for each of the other datasets; and disregarding or ignoring a second similarity measure for each other dataset associated with a class corresponding to the class of the datasets.

9. The computing system of claim 7, wherein the difference measure is indicative of the similarity of the example document to other example documents associated with the same class relative to the example documents of the other datasets associated with the respective different classes of the batch.

10. The computing system of claim 7, wherein determining the first similarity measure comprises determining, by the models to be trained, an average dot product of the numerical representation to each other numerical representations associated with the same class, and wherein determining the second similarity measure comprises determining, by the models to be trained, the average dot product of the numerical representation to each of the other numerical representations in other respective datasets associated with the respective different classes.

11. A computer-readable storage medium storing instructions that, when executed by a computing system, cause the computing system to perform operations including:

storing, by a computer-readable memory, a training data database comprising a plurality of datasets of example documents generated by or associated with customers of an accounting system;

at a model training system of the accounting system, the model training system comprising a network interface, one or more processors, and a computer-readable memory storing a model training module, and models to be trained comprising an image-based numerical representation generation model and a text-based numerical representation generation model, the model training system further comprising one or more processors configured to execute instructions stored in the memory, extracting from the training data database and via a communications network and the network interface, a batch of training data for training the models to be trained, the extracted training data comprising a plurality of datasets, each dataset associated with a label and comprising at least one numerical representation of an example document;

determining, by the model training system, a number of classes of labels in the batch, wherein each class is associated with a unique attribute value;

determining, by the model training system, a number of numerical representations associated with each class in the batch;

providing the numerical representations to the models to be trained;

for each numerical representation in each dataset:

determining, by the models to be trained, a first similarity measure indicative of a similarity of the numerical representation to other first numerical representations associated with a same class;

determining, by the models to be trained, a second similarity measure for each of other datasets associated with a different respective class in the batch, each second similarity measure indicative of the similarity of the numerical representation to each of the at least one numerical representations of respective other datasets associated with respective different classes of the batch;

determining, by the models to be trained, a difference measure as a function of the first similarity measure and one or more second similarity measures; and determining, by the models to be trained, a normalized difference measure by dividing the difference measure by the number of example documents associated with the same class of the datasets;

determining, by the model training system, a loss value as a function of normalized difference measures of the example documents in the batch, wherein determining the loss value comprises summing the normalized difference measures of the numerical representations in the batch and dividing by the number of classes that have a dataset with at least one numerical representation;

back-propagating the loss value through a plurality of layers of the models being trained including calculating, by the accounting system, based on the determined loss value, at each layer of neurons in the text-based numerical representation generation model and the image-based numerical representation generation model a plurality of error gradients; and adjusting, by the model training system, based on the plurality of error gradients, weights of each layer of neurons in the text-based numerical representation generation model and the image-based numerical representation generation model to train the text-based numerical representation generation model and the image-based numerical representation generation model.

12. The computer-readable storage medium of claim 11, wherein determining the second similarity measure for each of the other datasets associated with a different respective class in the batch comprises:

determining, by the models to be trained, a second similarity measure for each of the other datasets; and disregarding or ignoring a second similarity measure for each other dataset associated with a class corresponding to the class of the datasets.

13. The computer-readable storage medium of claim 11, wherein the difference measure is indicative of the similarity of the example document to other example documents associated with the same class relative to the example documents of the other datasets associated with the respective different classes of the batch.

14. The computer-readable storage medium of claim 11, wherein determining the first similarity measure comprises determining, by the models to be trained, an average dot product of the numerical representation to each other numerical representations associated with the same class, and wherein determining the second similarity measure comprises determining, by the models to be trained, the average dot product of the numerical representation to each of the other numerical representations in other respective datasets associated with the respective different classes.

* * * * *